United States Patent
Genrich

(10) Patent No.: US 6,590,948 B1
(45) Date of Patent: Jul. 8, 2003

(54) PARALLEL ASYNCHRONOUS SAMPLE RATE REDUCER

(75) Inventor: Thad J. Genrich, Aurora, CO (US)

(73) Assignee: Raytheon Company, Lexington, MA (US)

(*) Notice: Subject to any disclaimer, the term of this patent is extended or adjusted under 35 U.S.C. 154(b) by 0 days.

(21) Appl. No.: 09/527,411

(22) Filed: Mar. 17, 2000

(51) Int. Cl.[7] .................................................. H04L 7/00
(52) U.S. Cl. ..................................................... 375/355
(58) Field of Search ................................ 375/355, 360, 375/354, 316, 363

(56) References Cited

U.S. PATENT DOCUMENTS

| | | | |
|---|---|---|---|
| 3,969,615 A | * 7/1976 | Bowers et al. ............... | 700/189 |
| 4,077,063 A | 2/1978 | Lind ........................... | 364/729 |
| 4,486,846 A | 12/1984 | McCallister et al. ........ | 364/607 |
| 4,787,058 A | 11/1988 | Schmars ...................... | 364/807 |
| 4,809,205 A | 2/1989 | Freeman ...................... | 364/721 |
| 4,926,443 A | 5/1990 | Reich .......................... | 375/102 |
| 4,975,699 A | 12/1990 | Frey ............................ | 341/118 |
| 5,027,087 A | 6/1991 | Rottinghaus ................. | 332/127 |
| 5,111,162 A | 5/1992 | Hietala et al. ............... | 332/127 |
| 5,146,418 A | 9/1992 | Lind ........................... | 364/729 |
| 5,204,676 A | * 4/1993 | Herrmann .................... | 341/61 |
| 5,249,204 A | 9/1993 | Funderburk et al. .......... | 375/97 |
| 5,276,633 A | 1/1994 | Fox et al. .................... | 364/721 |
| 5,315,620 A | 5/1994 | Halawani et al. ........... | 375/102 |
| 5,483,203 A | 1/1996 | Rottinghaus ................. | 331/10 |
| 5,504,751 A | * 4/1996 | Ledzius et al. .............. | 341/144 |
| 5,517,529 A | 5/1996 | Stehlik ........................ | 375/316 |
| 5,596,609 A | 1/1997 | Genrich et al. .............. | 375/350 |
| 5,697,068 A | 12/1997 | Salvi et al. ................... | 455/76 |

(List continued on next page.)

FOREIGN PATENT DOCUMENTS

| | | | |
|---|---|---|---|
| EP | 0 102 784 A2 | 3/1984 | ............. G06F/1/02 |
| EP | 0 889 595 A1 | 1/1999 | ............. H03L/7/18 |
| EP | 0 926 857 A2 | 6/1999 | ............. H04L/7/02 |
| GB | 2152715 A | 8/1985 | ............. G06F/7/548 |
| WO | WO 86/06517 | 11/1986 | ............. G06F/1/02 |
| WO | WO 92/02872 | 2/1992 | ............. G06F/1/035 |
| WO | WO 99/23760 | 5/1999 | ............. H04B/1/16 |
| WO | WO 99/49582 | 9/1999 | ............. H04B/1/10 |

OTHER PUBLICATIONS

Aschwanden, Felix, "Direct Conversion—How to Make it Work in TV Tuners," IEEE Transactions on Consumer Electronics, US, IEEE Inc. New York, vol. 42, No. 3, Aug. 1, 1996, pp. 729–738, XP 000638561.

(List continued on next page.)

*Primary Examiner*—Chi Pham
*Assistant Examiner*—Kevin M Burd
(74) *Attorney, Agent, or Firm*—Baker Botts L.L.P.

(57) ABSTRACT

A parallel asynchronous sample rate reducer (26) for converting a synchronous parallel digital input signal (INP_DAT) into a parallel digital output signal (OUT_DAT) having an average aggregate sample rate that is asynchronous with respect to the input sample clock rate. The sample rate reducer (26) includes a parallel phase accumulator (36) for determining the output sample number values and the fractional phase values corresponding to each output sample number combined in an output value (PHS_ACC). Control logic (34) receives the phase accumulator output value PHS_ACC and generates an interpolator value (CTL_INT) for controlling interpolation of the input data to interpolate the data to the predetermined output sample number and the corresponding fractional phase values. The control logic (34) also generates control a build value (CTL_BLD) to enable alignment of the interpolated data signals. A parallel interpolator (30) receives the input samples and the interpolator control value (CTL_INT) to generate a parallel interpreted data signal (PAR_INT) of the samples. A parallel word builder (32) then erases invalid samples and compresses samples to the output data word (OUT_DAT) of consecutive, valid samples.

15 Claims, 6 Drawing Sheets

U.S. PATENT DOCUMENTS

| | | | |
|---|---|---|---|
| 5,790,601 A | 8/1998 | Corrigan, III et al. | 375/302 |
| 5,812,940 A | 9/1998 | Lindell | 455/114 |
| 5,815,117 A | 9/1998 | Kolanek | 342/442 |
| 5,894,592 A | 4/1999 | Brueske et al. | 455/86 |
| 5,991,605 A | 11/1999 | Rapeli | 455/76 |
| 6,028,493 A | 2/2000 | Olgaard et al. | 332/103 |
| 6,055,280 A | 4/2000 | Genrich | 375/325 |
| 6,133,804 A | 10/2000 | Wagner et al. | 332/127 |
| 6,298,093 B1 | 10/2001 | Genrich | 375/271 |
| 6,366,225 B1 * | 4/2002 | Ozdemir | 341/111 |

OTHER PUBLICATIONS

Hogenauer, Eugene B., Manuscript: "*An Economical Class of Digital Filters for Decimation and Interpolation*", IEEE Transactions on Acoustics, Speech and Signal Processing, vol. ASSP–29, No. 2, Apr. 1981, 9 pages.

Gardner, F.M., "*Interpolation in Digital Modems/Part I: Fundamentals*", IEEE Transactions on Communications, IEEE Inc., New York, vol. 41, No. 3, Mar. 1, 1993, pp. 501–507, XP000372693.

"*Apparatus and Method for Quadrature Tuner Error Correction*", Specification, Claims and Abstract (32 pages), drawings (3 pages), Application Ser. No. 09/358,354 filed Jul. 21, 1999, inventor Thad J. Genrich, Attorney Docket No. 065597.0113.

"*Digital Tuner with Optimized Clock Frequency and Integrated Parallel CIC Filter and Local Oscillator*", Specification, Claims and Abstract (22 pages), drawings (3 pages), Application Ser. No. 09/527,798 filed Mar. 17, 2000, inventor Thad J. Genrich, Attorney Docket No. 065597.0114.

Gardner, Floyd M., "Interpolation in Digital Modems—Part I: Fundamentals", IEEE Transactions on Communications, Mar. 1993, vol. 41, No. 3, 8 pages.

"*Method and System for Generating a Trigonometric Function*", Specification, Claims and Abstract (30 pages), 2 pages of drawings, inventor Thad J. Genrich, filed Jul. 27, 1999, U.S. Appln. Ser. No. 09/361,917.

* cited by examiner

PARALLEL ASYNCHRONOUS SAMPLE RATE REDUCER

TECHNICAL FIELD OF THE INVENTION

This invention relates generally to a parallel asynchronous sample rate reducer and, more particularly to an asynchronous sample rate reducer for converting a synchronous parallel digital input signal into a parallel digital output signal with an average aggregate sample rate that is asynchronous with respect to the input sample clock rate.

BACKGROUND OF THE INVENTION

Existing communication systems typically include modulators and demodulators designed to operate at relatively high speeds. In order to further improve the throughput of modulation/demodulation systems, conventional systems use modulated parallel, digital signals for transmission and demodulation upon receipt. Thus, the throughput of such communication systems depends upon the speed of modulation and demodulation. Present implementation of the modulation systems include sample rate reducers. Sample rate reducers typically process one sample during each clock cycle. An example of such a system may be found with reference to "Interpolation in Digital Modems—Part 1: Fundamentals", Floyd Gardner, IEEE Transactions On Communications, Vol. 41, No. 3, Mar. 3, 1993, pp. 501–507. The Gardner reference describes an approach for using interpolation in digital modems to expedite the demodulation process.

In accordance with the present invention there is provided a high data rate demodulator.

Further in accordance with the present invention there is provided a parallel asynchronous sample rate reducer that converts a synchronous parallel digital input signal into a parallel digital output signal having an average aggregate sample rate that is asynchronous with respect to the input sample clock rate.

Also in accordance with the present invention there is provided a digital demodulator having an input sample rate that is asynchronous with respect to the demodulated output data rate.

SUMMARY OF THE INVENTION

In accordance with the teachings of the present invention, a sample rate reducer processes a parallel input data stream sampled at a sample clock rate into a parallel output data stream at a sample rate that is asynchronous with respect to the sample clock rate. The sample rate reducer includes a parallel phase accumulator for receiving a sample control signal that varies in accordance with a desired sample frequency. The parallel phase accumulator generates a parallel phase accumulator value having a plurality of components, each component including a sample number and a fractional phase value. A logic controller receives the parallel phase accumulator value and a frequency control signal, and the logic controller generates a parallel interval control value defining a desired time delay between an input sample and a required output sample. The logic controller also generates a parallel control build value which includes the phase accumulator value sample number with multiple, identical sample numbers reduced to a single sample. A parallel interpolator receives the parallel input stream of data and generates a parallel interpolator output data stream. The parallel interpolator output data stream includes interpolated values at the intervals defined by the interval control value. A parallel word builder receives the control build value from the logic controller and the parallel interpolator output data stream, and assembles valid samples from the parallel interpolator output data stream to form the parallel output data stream comprising interpolated values corresponding to consecutively numbered samples.

BRIEF DESCRIPTION OF THE DRAWINGS

The present invention will be understood from the following description and the appended claims, taken in connection with the accompanying drawings.

DETAILED DESCRIPTION OF THE DRAWINGS

Figure 1:
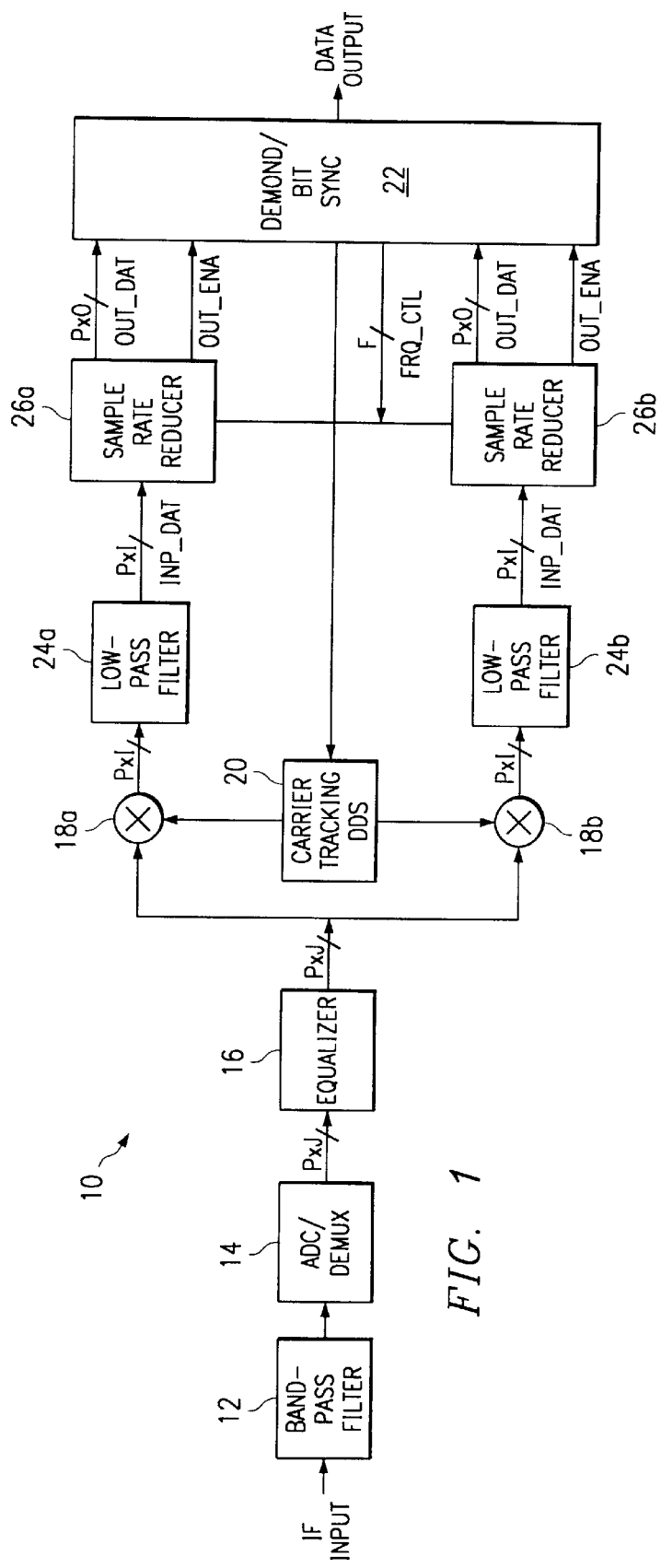
FIG. 1 is a block diagram of a demodulator/bit synchronizer incorporating a parallel asynchronous sample rate reducer.

The parallel asynchronous sample rate reducer of the present invention will be described with respect to an exemplary application in a demodulator/bit synchronizer 10 of FIG. 1. Demodulator 10 receives an intermediate frequency (IF) input signal. The IF input signal is typically modulated and transmitted as a radio frequency (RF) signal. The RF signal is received and converted to the IF input signal that is input to a bandpass filter 12. Bandpass filter 12, as is known in the art, enables only preselected bandwidths to migrate from the input to the output, and the frequencies outside of the predetermined bandwidth are rejected. The passed signal is input to an analog to digital converter (ADC)/demultiplexer 14. ADC/demultiplexer 14 performs two functions. First, the passed signal output by bandpass filter 12 is converted from an analog signal to a digital signal and, second, the demultiplexer takes the converted digital signal and decodes the signal into a plurality of P parallel digital samples each being J bits wide. The parallel digital samples are input to an equalizer 16 for adjusting the values of the P samples so that the equalizer outputs P×J equalized samples.

The P×J samples are input to a pair of digital multipliers 18a, 18b to be multiplied by a carrier tracking signal output by a direct digital synthesizer (DDS) 20. The direct digital synthesizer 20 receives a control signal from the demodulator/bit synchronizer 22 and outputs a digital sine wave to each of digital multipliers 18a, 18b. The sine waves are ninety degrees out of phase so that each digital multiplier outputs a quadrature component of the input signal. The control signal output by demodulator/bit synchronizer 22 is determined in accordance with the carrier frequency of the IF input signal. The output from digital multipliers 18a, 18b is input to lowpass filters 24a, 24b, respectively, to remove high frequency components from the P×I digitally multiplied signals. The passed signals are input to sample rate reducers 26a, 26b, respectively.

Sample rate reducers 26a, 26b convert the synchronous parallel digital signals output by lowpass filters 24a, 24b into parallel digital output signals with an average aggregate sample rate that is asynchronous with respect to the input sample clock rate. Demodulator/bit synchronizer 22 receives the parallel digital output signals and outputs a frequency control signal FRQ_CTL comprising a digital signal F bits wide. The FRQ_CTL signal is typically the feedback signal for a phase lock loop controller and is a reconstruction of the data clock frequency. FRQ_CTL indicates the average aggregate sample rate required to insure the demodulator/bit synchronizer 22 locks onto the incoming signal for demodulation. Alternatively, the FRQ_CTL signal is a programmed fixed value. Sample rate reducers 26a, 26b output a parallel data word OUT_DAT having P samples each O bits wide, P×O. Sample rate reducers 26a, 26b also provide binary output enable signals OUT_ENA typically set high to indicate to the demodulator/bit synchronizer 22 that sample rate reducers 26a, 26b are outputting a data word. Demodulator/bit synchronizer 22 demodulates the output data word OUT_DAT from the sample rate reducers 26a, 26b, thereby providing the output data stream.

In operation, the sample rate reducers 26a, 26b convert the synchronous, parallel, digital input signal into a parallel, digital output signal with an average aggregate sample rate asynchronous with respect to the input sample clock rate.

Figure 2:
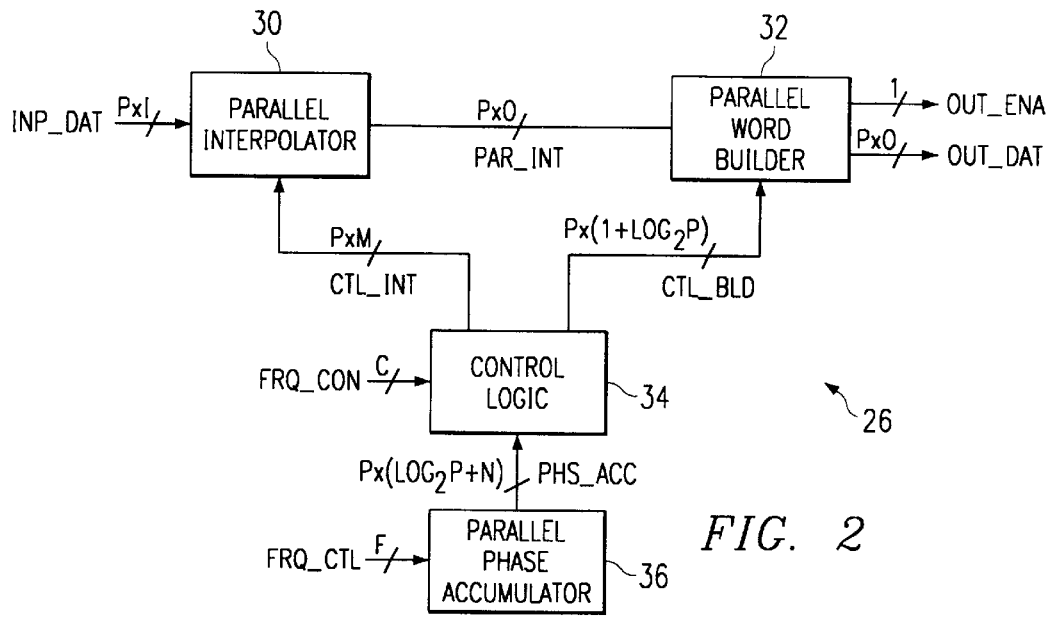
FIG. 2 is a block diagram of a parallel asynchronous sample rate reducer arranged in accordance with the present invention.

Referring to FIG. 2, there is shown an expanded block diagram of sample rate reducers 26a, 26b. Since operation of the sample rate reducers 26a, 26b is substantially the same the description of the sample rate reducer will be referred to by reference numeral 26. Referring to FIG. 2, an input data stream or INP_DAT signal, received from the output of lowpass filter 24, consisting of P parallel samples of I bit each, is input to a parallel interpolator 30. As will be described in greater detail herein, parallel interpolator 30 operates to perform a mathematical process of estimating an independent variable "y" given a fixed variable "x" in a set of ordered pairs $(x_i, y_i)$. Parallel interpolator 30 also receives a control interval value CTL_INT consisting of P parallel fractional interval values of M bits each. Each value represents a time delay between an input sample and a corresponding, required sample output by parallel interpolator 30. The time delay is represented as a fraction of an input sample. Parallel interpolator 30 outputs a PAR_INT data stream or signal comprising P parallel samples of O bits each.

The PAR_INT signal is input to parallel word builder 32. Parallel word builder 32 also receives a control value CTL_BLD comprising P control words of $(1+\log_2 P)$ bits each. The one bit functions as an enable bit, and the $\log_2 P$ bits correspond to output sample number bits. For purposes for this embodiment, assume that P is an integer power of 2, so that $\log_2 P$ is an integer value. Each enable bit indicates whether the corresponding sample in the PAR_INT signal is to be included in the final output data stream OUT_DAT. The output sample value corresponding to the $\log_2 P$ output sample number bits indicates the relative order of the enabled samples of the output data stream OUT_DAT. Parallel word builder 32 assembles valid interpolator symbols into the output data stream or word OUT_DAT. Each OUT_DAT word comprises P consecutively numbered samples of O bits each. The OUT_ENA signal goes high whenever a new OUT_DAT word is available from parallel word builder 32.

The CTL_INT and CTL_BLD values are generated by control logic 34. Control logic 34 receives two inputs. The first input is a phase accumulator value PHS_ACC comprising P phase values each having $\log_2 P$ output sample number bits and N fractional phase value bits. The second input to control logic 34 is a frequency control value FRQ_CON, comprising a ratio of the input sample rate to the nominal or the average output sample rate. Control logic 34 generates the CTL_INT and CTL_BLD values from the enable bit, $\log_2 P$ portion of the CTL_BLD value and the M bit fractional intervals of the CTL_INT value. The enable bit is generated by comparing adjacent $\log_2 P$ sample numbers of the PHS_ACC value. When an output sample number has changed a previous, generally adjacent, lower indexed value, the corresponding output enable is asserted. Control logic 34 also determines the factional interval values of the CTL_INT word by multiplying the N least significant bits of each of the PHS_ACC values by the constant value FRQ_CON, previously described, is the ratio of the input sample rate to the nominal or the average output sample rate.

Parallel phase accumulator 36 generates the PHS_ACC value in accordance with and based on a frequency control word FRQ_CTL, which is F bits wide. The parallel phase accumulator 36 essentially determines the $\log_2 P$ sample numbers and the fractional values N as inputs to control logic 34 in generating the CTL_INT and CTL_BLD control values.

Figure 3:
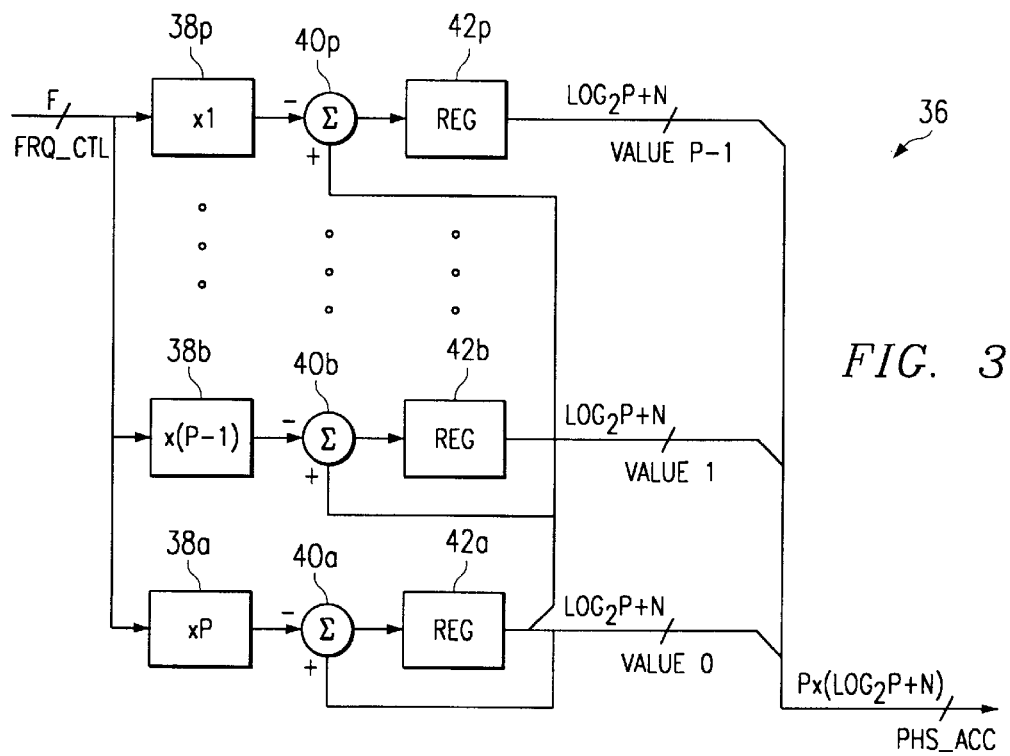
FIG. 3 is an expanded block diagram of the parallel phase accumulator of FIG. 2.

FIG. 3 is an expanded block diagram of parallel phase accumulator 36 of FIG. 2. As shown, parallel phase accumulator 36 receives a F bits wide control word FRQ_CTL. The control word is input to each of the frequency control multiplication registers 38a, 38b, ..., 38p, where the number of registers is generally equal to the number of samples P. Parallel phase accumulator 36 effects a multiplication operation wherein the FRQ_CTL value is multiplied by P, (P−1), ..., 1 at registers 38a, 38b, ..., 38p, respectively. An output from the respective registers 38a, 38b, ..., 38p is input to an interconnected subtractor 40a, 40b, ..., 40p. Each subtractor 40a, 40b, ..., 40p operates to subtract the output of the respective interconnected multiplier 38a, 38b, ..., 38p from a reference value. The reference value is the output from subtractor 40a during the previous clock period, which is stored in a register 42a. Similarly, the output from register 42a is input to each of subtractors 40b, ..., 40p so that the output for each respective register is subtracted from this reference value. The output from each respective subtractor 40a, 40b, ..., 40p is stored in an interconnected register 42a, 42b, ..., 42p, respectively.

As can be seen, because P output values must be generated, the output of register 42a is used as the reference value to compute the remaining P−1 output values. For example, VALUE 1 is computed by subtracting the product of FRQ_CTL and P−1 from the reference value output by register 42a. The remaining outputs are generated in a similar manner.

In operation, frequency control multiplication registers 38 are typically implemented using pipelined shift and addition/subtraction operations to reduce logic requirements. All multiplication paths have the same pipeline delay to cause all outputs to update during the same clock cycle in response to a particular frequency control input value change. Each register 42a, 42b, ..., 42p, outputs a value VALUE 0, VALUE 1, ..., VALUE P−1, respectively. Each value is ($\log_2 P+N$) bits wide, where the $\log_2 P$ bits correspond to the sample number and the N bits correspond to the factional phase values. The values are combined to form phase accumulator output word value PHS_ACC, as an as an input to control logic 34. Thus, each clock cycle of the parallel phase accumulator 36 emulates a conventional phase accumulator that is clocked P cycles. The PHS_ACC value output by phase accumulator 36 represents a new sample rate to be used to resample the data asynchronously from the input rate of INP_DAT, providing a different effective output sample rate.

Figure 4:
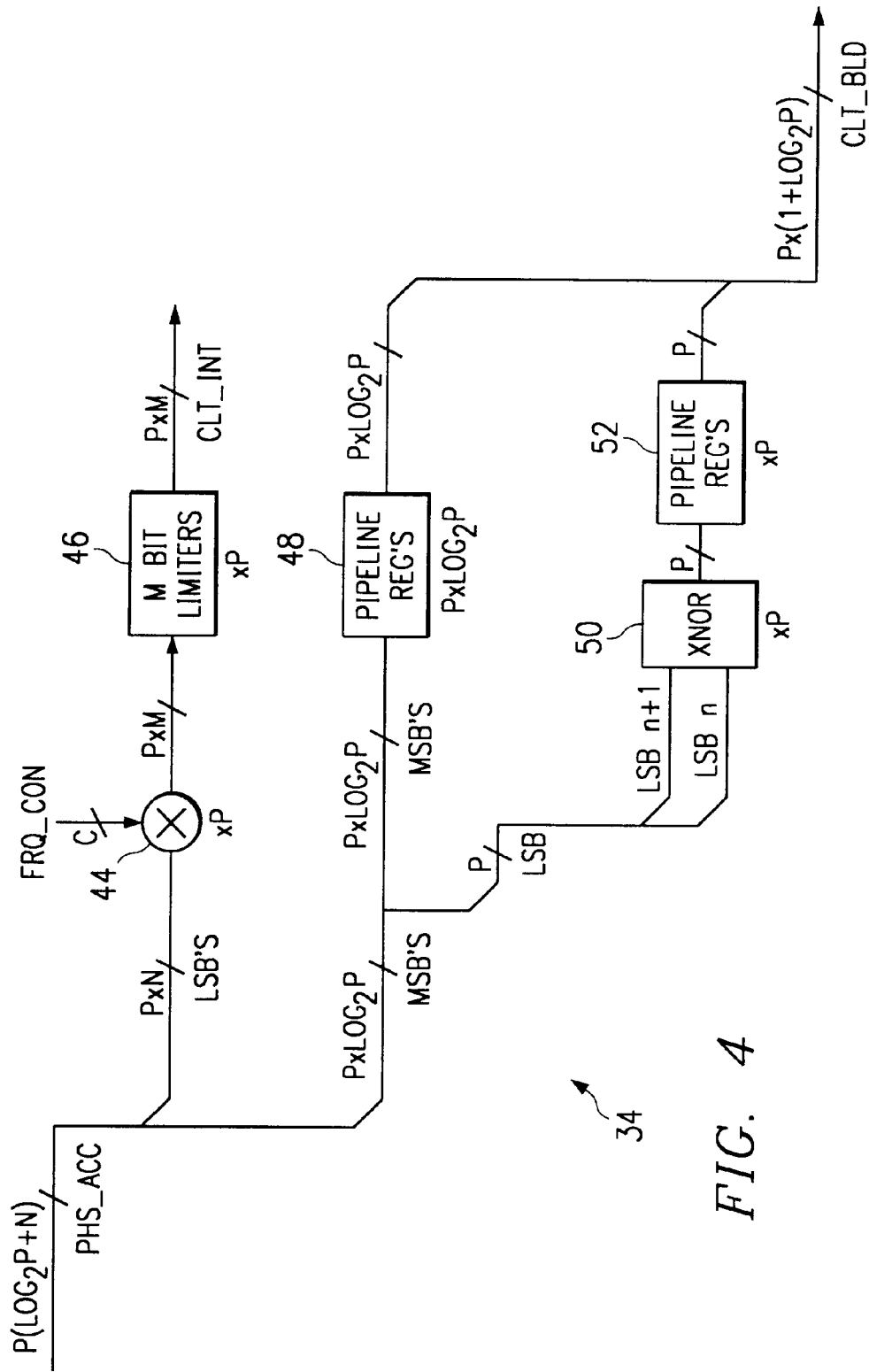
FIG. 4 is an expanded block diagram of the control logic of FIG. 2.

FIG. 4 illustrates an expanded block diagram of control logic 34. As shown, the PHS_ACC word is input to control logic 34. Control logic 34 generates two control value words, the control interval value word CTL_INT and the control build value word CTL_BLD. To generate the CLT_INT word, control logic 34 strips off the N least significant bits of the sample interval PHS_ACC value, and multiplies that value by frequency control C bits wide value word FRQ_CON. Multiplication is a function of the multiplier 44. The output from multiplier 44 comprises P samples M bits wide. This output is input to M Bit limiter 46 to minimize output overflow. One skilled in the art will recognize that there is one multiplier 44 and one limiter 46 for each sample of PHS_ACC for a total of P multipliers 44 and P limiters 46. The output from limiter 46 is the control interval value word CTL_INT.

In operation, the multiplication described herein maybe effected by pipelined shift and add operations. For example, if the input sample rate is approximately 2.5 samples per symbol and the average output sample rate is 2 samples per symbol, the ratio is 2.5:2=5:4. Multiplication by 5 may be implemented by adding a value to the same value shifted left two bits, or multiplied by 4. Division by 4 can be implemented by shifting the result right 2 bits. Limiter 46 prevents overflow in response to temporarily higher than average FRQ_CTL values. The CTL_INT value word comprises P fractional interval values of M bits each.

In order to generate the CTL_BLD control word, the P output sample numbers are sent to P pipeline registers 48 each $\log_2 P$ bits wide. Pipeline register 48 introduces a delay equal to the sum of the delay introduced by multiplier 44 and limiter 46. The $\log_2 P$ most significant bits of the PHS_ACC word is input to the P×$\log_2 P$ pipeline registers 48. The least significant bit of the current output sample number is compared to the previous, adjacent least significant bit using exclusive NOR gates having output high enable values when adjacent output sample numbers are not equal. Only the least significant bits need to be compared because the sample numbers will only differ by one at most. The selection of the frequency assures that no samples will be skipped. For example, exclusive NOR gate XNOR 50 compares the least significant bit of a sample with the least significant bit of the previous sample within the PHS_ACC word to determine if the sample numbers are identical. For the last sample number, the least significant bit of the last sample number for one cycle is stored for comparison with the least significant bit of the first sample number of the next cycle. If the least significant bits are not identical, XNOR gate 50 outputs a high value. The output from XNOR gate 50 is input to pipeline register 52 to effect a delay to synchronize the respective outputs for CTL_INT and CTL_BLD control value words. The delay introduced by pipeline register 52 is equal to the sum of the delays for multiplier 44, limiter 46, and parallel interpolator 30 pipeline delays. The enable signal output by pipeline register 52 and the $\log_2 P$ bits output by pipeline register 48 combine to form the CTL_BLD control value word.

In one embodiment, a flip flop or other delay element is utilized to store the least significant bit for the last sample for one cycle to be compared with the least significant bit of the first sample for the next cycle. Further, one skilled in the art will recognize that pipeline register 48, XNOR gate 50, and pipeline register 52 are shown for a single sample of the P samples. Further, the configuration is repeated P times, once for each sample.

Figure 5:
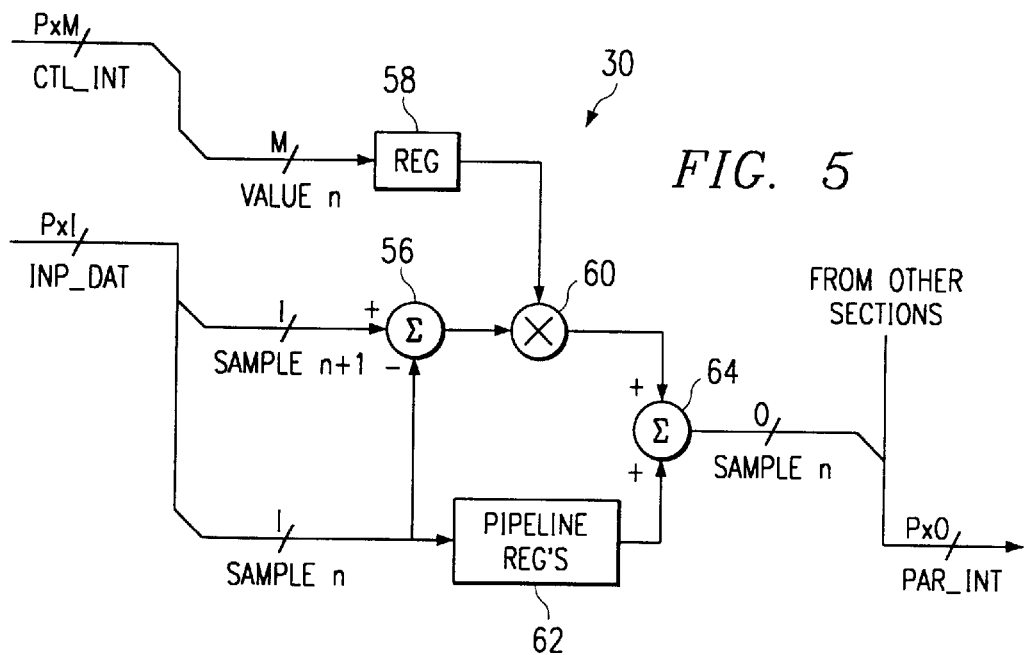
FIG. 5 is an expanded block diagram of the parallel interpolator of FIG. 2.

Referring to FIG. 5, there is illustrated one of P identical sections of parallel interpolator 30. Not shown is a register for storing the last input sample for each clock cycle for use with the first input sample on the succeeding clock cycle, to be used only for the first of the P identical sections. The INP_DAT word is separated into two consecutive samples, referred to as sample n and n+1, each sample being I bit wide. The earlier sample (n) value is subtracted from the succeeding sample (n+1) value by a subtractor 56. The difference is multiplied by the corresponding CTL_INT value previously stored in register 58 to effect a delay. The difference is multiplied by the CTL_INT value at multiplier 60, and the output from multiplier 60 is added to the sample n value previously stored in pipeline register 62. Pipeline register 62 introduces a delay equal to 1 plus the delay of multiplier 60. Summation of the earlier sample (n) value and the product output by multiplier 60 occurs at summer 64 having a O bits wide output word. The output from summer 64 is then combined with the output from other sections to form the parallel interpolator PAR_INT data word.

In operation, a pipeline shift and add multiplier implementation can be used to perform the pipeline and output adder functions by applying the earlier sample value to the first adder in the shift/add chain. Further, one skilled in the are will recognize that while a linear interpolator is described herein, other interpolations, such as piecewise parabolic or cubic interpolator structures maybe implemented as well.

Figure 6:
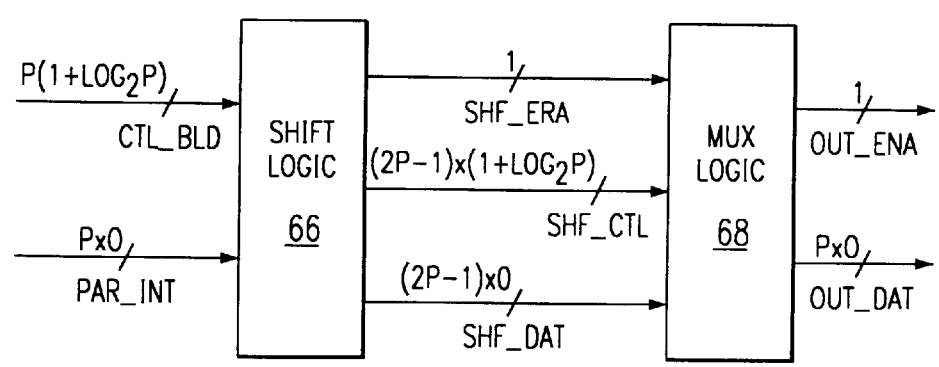
FIG. 6 is an expanded block diagram of the parallel word builder of FIG. 2.

Referring to FIG. 6, parallel word builder 32 consolidates enabled (or valid) output samples from the PAR_INT data stream which are randomly interspersed with disabled samples (or erasures). Word builder 32 outputs data word OUT_DAT having only valid samples. Parallel phase accumulator 36 through control logic 34 generates P unique output sample numbers for each group of P consecutive valid samples. The sample numbers function as control signals to direct the ordering of the OUT_DAT samples. The parallel word builder 32 receives the CTL_BLD value word from control logic 34 and receives the PAR_INT data word from parallel interpolator 30. The CTL_BLD and PAR_INT words are input to shift logic 66. Shift logic 66 assembles the P samples INP_DAT applied to the parallel interpolator 30 in accordance with the CTL_BLD values to form 2P−1 shift control values SHF_CTL and shift data samples SHF_DAT. Each 2P−1 SHF_CTL value comprises an enable bit and $\log_2 P$ values which correspond to sample numbers. The SHF_DAT word comprises 2P−1 samples O bits wide. Shift logic 66 also generates a one bit shift erase SHF_ERA signal utilized to direct multiplexer 68 to erase the SHF_DAT data samples when SHF_ERA is high, as will be described herein. Multiplexer 68 selects consecutively numbered, valid samples from the 2P−1 data samples of SHF_DAT to obtain P output data samples OUT_DAT each O bits wide. Multiplexer 68 performs this selection in accordance with the SHF_CTL values. Multiplexer 68 also generates an output enable signal OUT_ENA when the OUT_DAT word is available from parallel word builder 32.

Figure 7:
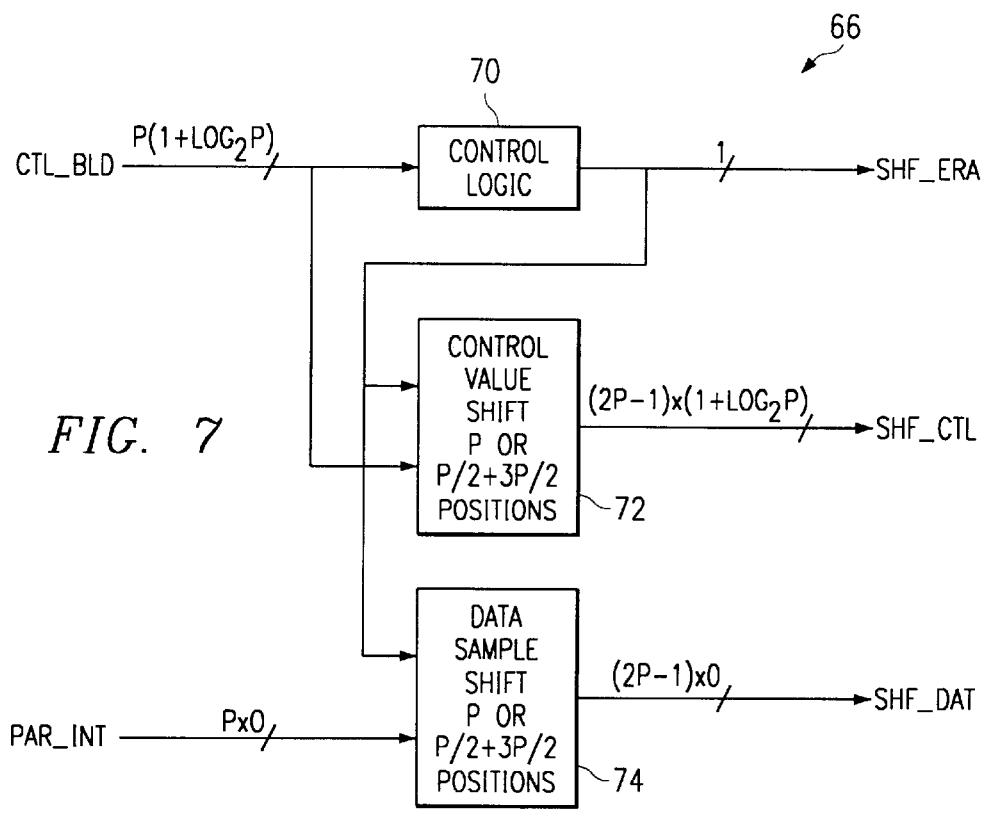
FIG. 7 is an expanded block diagram of the shift logic of FIG. 6.

Referring to FIG. 7, there is illustrated a block diagram of shift logic 66 of FIG. 6. Shift logic 66 typically shifts the SHF_DAT samples P positions to the right or P positions lower with respect to the output port numbers. Samples at the PAR_INT input port numbers 0 to P–2 normally appear first at SHF_DAT output port numbers P to 2P–2, while the sample at PAR_INT port number P–1 is stored internally in a register. The samples at SHF_DAT port numbers P to 2P–2 and the internally stored sample are normally shifted down to output port number 0 to P–1. Shift logic 66 includes an internal control logic 70 for analyzing samples of the CTL_BLD word and generate output signals to control value shift logic 72 and the data sample shift logic 74. Control logic 70 also outputs the shift erase SHF_ERA signal. Control value shift logic 72 outputs the shift control word SHF_CTL. Data sample shift logic 74 receives the PAR_INT data word and shifts the samples of the data word in accordance with signals from control logic 70 in order to output the shift data word SHF_DAT.

The SHF_DAT output port numbers 0 to 2P–2 provides P consecutively numbered output samples to multiplexer 68 unless a word erasure condition exists. When PAR_INT sample number alignment will normally cause consecutively numbered output samples to be split across two SHF_DAT output cycles, a two cycle correction sequence shifts the output samples to prevent such a split. In such a situation, control logic 70 generates control signals to cause a P/2 sample right shift on a first cycle with P/2 samples stored internally in the respective shifters 72, 74. The first cycle is then immediately followed by a 3P/2 right shift during a second cycle. These shifts occur in control value shift logic 72 for the CTL_BLD word and in data sample shift logic 74 for the PAR_INT word. The CTL_BLD values are shifted in conjunction with the PAR_INT samples to preserve the relationship between the control values and the data samples.

The condition that initiates a correction sequence detected through control logic 70 requires two consecutive cycles to detect. First an output sample number zero must be present on one of the PAR_INT port numbers P/2 to P–1. On the succeeding cycle an output sample number zero must not be present on any of the PAR_INT port numbers P/2 to P–1. Once this condition is detected at the CTL_BLD inputs, a one cycle delay is entered before the correction sequence begins. During this delay cycle, the SHF_ERA signal goes high.

Figure 8:
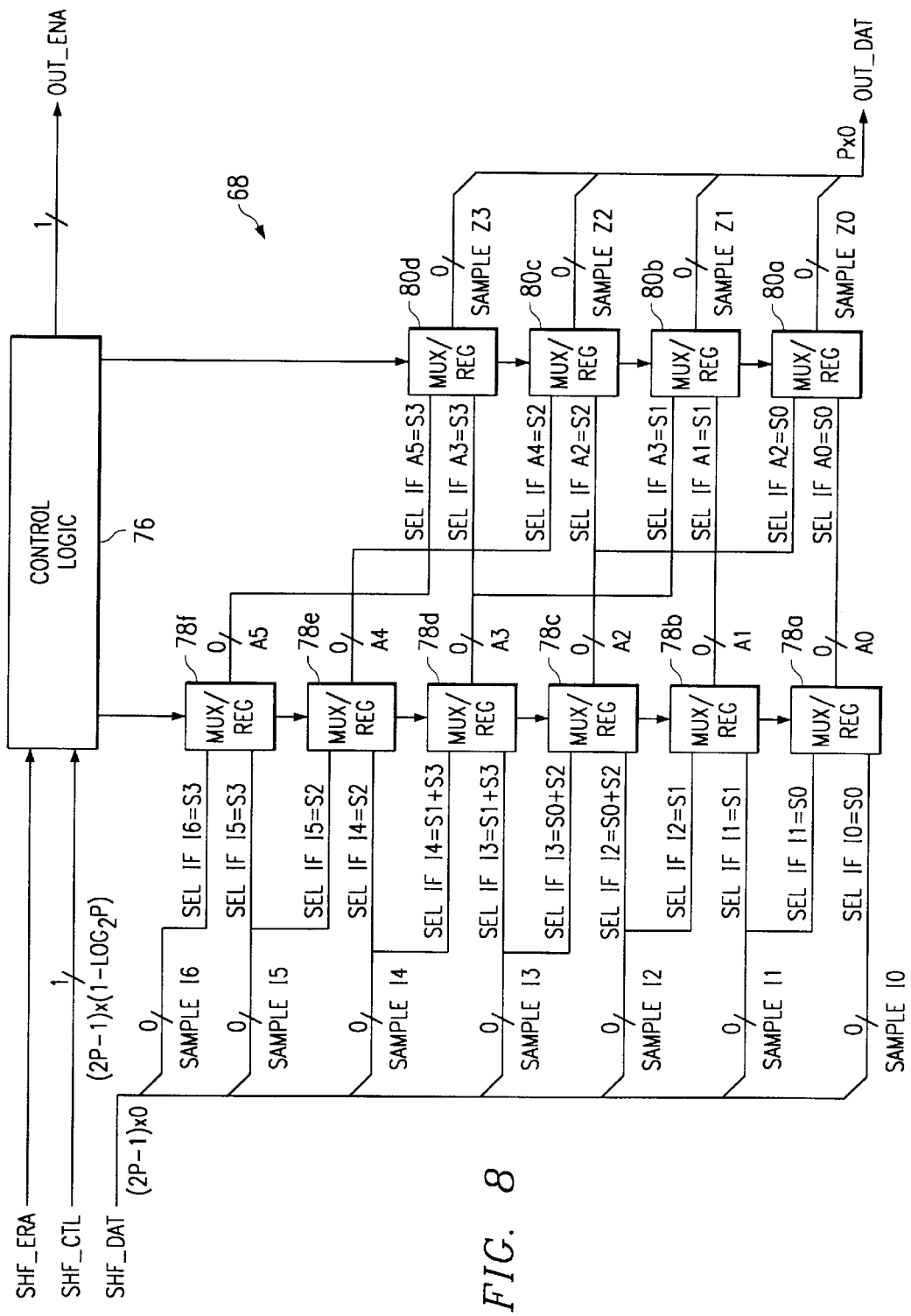
FIG. 8 is an expanded block diagram of the multiplexer logic of FIG. 6.

FIG. 8 illustrates an exemplary block diagram of multiplexer 68 implemented by way of example, for a system in which P=4. It will become apparent to one skilled in the art that multiplexer 68 can be expanded for greater values of P or reduced for lesser values of P. Multiplexer 68 includes control logic 76 receiving the SHF_ERA signal and the SHF_CTL value word output by shift logic 66. Control logic 76 responds to the SHF_ERA and SHF_CTL words and generates output control signals to direct multiplexer/register (mux/regs) 78a, 78b, . . . , 78f and mux/regs 80a, 80b, 80c, and 80d. Mux/regs 78, 80 select one of a pair of input signals for an output signal to generate the output data OUT_DAT word. Control logic 76 decodes the shift eraser SHF_ERA word and the shift control SHF_CTL enables. Control logic 76 outputs control signals to mux/regs 78, 80 to pass selected samples as the OUT_DAT word and also generates the OUT_ENA signal. The OUT_ENA signal goes high when the SHF_ERA signal is low. The output from mux/regs 78 is cascaded to mux/regs 80 in order to obtain 4 consecutive data samples, numbered 0–3, when all are simultaneously present on the seven SHF_DAT input samples, thus generating the P (P=4) output samples and the OUT_DAT word.

With respect to operation of mux/regs 78, 80, the notation of FIG. 8 will be described herein. The notation Sx (x=0, 1, 2, 3) refers to the sample number corresponding to the $\log_2 P$ bits of the PHS_ACC and CTL_BLD signals. Sample $I_y$ (y=0, 1, . . . , 6) refers to the actual input data ports in the (2P–1) SHF_DAT word. In other words, the (2P–1) data samples I1, I2, . . . , I6 in the SHF_CTL word are associated with a sample number in the (2P–1) samples of the SHF_DAT word. With respect to mux/regs 78, 80, control logic 76 generates control signals as inputs to each mux/regs 78, 80 to effect a selection. In particular, control logic 76 generates an output signal to mux/reg 78a so that mux/reg 78a outputs input sample I0 or I1 depending upon the corresponding sample positions in SHF_CTL having a sample number zero (S0), thereby selecting one of the two inputs to mux/reg 78a for output on line A0. Mux/reg 78b outputs input sample I1 or I2 depending upon the corresponding sample positions in SHF_CTL having a sample number one (S1). Mux/reg 78b thus outputs either input sample I1 or I2 as output A1. Similarly, mux/reg 78c selects either input sample I2 or I3 depending upon whether the corresponding sample position in SHF_CTL has either sample zero (S0) or two (S2). Mux/reg 78c thus outputs sample number I2 or I3 on output A2. Control logic 76 generates similar control signals to operate mux/regs 78d, 78e, and 78f. Control logic 76 also generates control signals to operate mux/regs 80a, 80b, and 80c, and 80d. In particular, control logic 76 generates selection signals to mux/reg 80a to select input A0 or A2 depending upon on the sample positions having sample number zero (S0). Mux/regs 80a thus outputs sample Z0. Mux/regs 80b, 80c, and 80d are similarly controlled by control logic 76 to output samples Z1, Z2, and Z3, respectively. Samples Z0, Z1, Z2, and Z3 are then combined to form OUT_DAT word consisting of P samples (P=4) each being O bits wide.

As can be seen from FIG. 8, two levels of mux/regs collect four consecutive samples numbered 0–3 when all are simultaneously present on the seven SHF_DAT input ports. Versions of multiplexer 68 to handle larger versions of samples require $\log_2 P$ levels of mux/regs to process 2P–1 input samples to generate P output samples. A limitation of P=4 multiplexer of FIG. 8 is that it can support a limited number of embedded (between 0 and P–1 erasures). This number depends on where the sample number zero appears on the four possible input ports of multiplexer 68. In particular, if output sample number zero appears on input port zero, a maximum of three embedded erasures can be supported; if sample number zero appears on input port one, two embedded erasure can be supported; if sample number zero appears on input port two, one embedded eraser can be supported; and if sample number zero appears on input port three, no embedded erasures can be supported. In order to compensate for the last two cases, because the asynchronous sample rate reducer must support embedded erasures, shift logic 66 aligns input samples for multiplexer 68 to allow embedded erasures under all possible alignments for the sample input word PAR_INT without the addition of additional multiplexer and more complex control logic.

Figure 9:
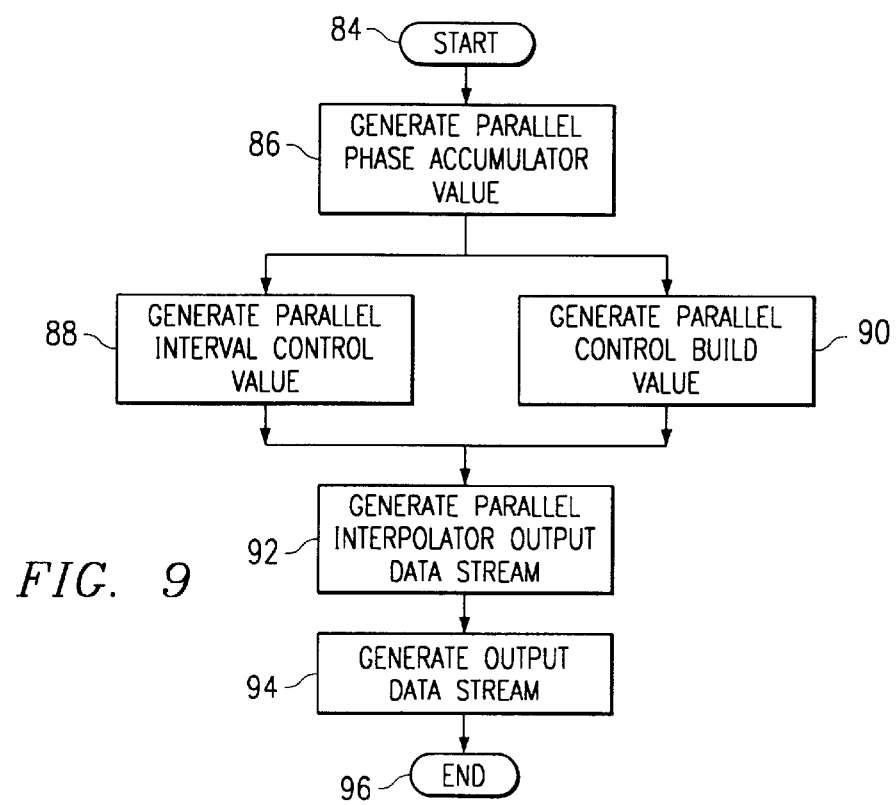
FIG. 9 is a flow chart illustrating a method for implementing the parallel interpolator.

Referring to FIG. 9, there is shown a block diagram of a method for implementing the sample rate reducer described with respect to FIGS. 1–8. The method starts at 84. The parallel phase accumulator value is generated at step 86 in accordance with the frequency control signal FRQ_CTL. The FRQ_CTL signal is used to generate the PHS_ACC value. After the PHS_ACC value is generated, control proceeds to step 88 where the PHS__ACC value is used to generate the parallel interval control value CTL__INT. At the same time, the PHS__ACC value is input to generate parallel build value as shown by step 90. During the operation of step 90, the CTL__BLD word is generated. Following steps 88 and 90, control proceeds to step 92 where the parallel interpolator generates the parallel interpolator output data stream PAR__INT. Control then proceeds to step 94 where the parallel word builder generates the output data stream OUT__DAT by inspecting the PAR__INT word and outputting consecutively numbered, valid interpolated samples as OUT__DAT.

In this particular embodiment, the simplified shift/multiplex sequence only supports a maximum of embedded erasers E≦P/2. Assuming a worst case scenario of an OUT__DAT erasure rate of P/2, the minimum overall sample rate reduction factor, which is equal to the output sample rate divided by the input sample rate, is P/(P+P/2)=⅔=0.67. The embodiment of the present invention supports a sample reduction rate of 0.67. It will be apparent to one skilled in the art that higher complexity shift and multiplexer algorithms can be devised to support higher values of E and corresponding lower sample rate reduction factors. The embodiments described is optimized for a nominal sample rate reduction of 0.8 with a margin for frequency control word variations above and below that value.

The asynchronous sample rate reducer described herein converts a synchronous parallel digital input signal to a parallel digital output signal with an average aggregate sample rate that is asynchronous with respect to the input sample clock rate. Applications for this structure include high data rate signal demodulators whose input sample rate is asynchronous to the demodulated output rate.

Although the invention has been described with particular reference to certain preferred embodiments thereof, variations and modifications can be effected within the spirit and scope of the following claims.

What is claimed is:

1. An apparatus for processing a parallel digital input data stream sampled at a sample clock rate into a parallel digital output data stream at a sample rate asynchronous with respect to the sample clock rate, comprising:

a parallel phase accumulator for receiving a sample control signal that varies in accordance with a desired sample frequency, the parallel phase accumulator generating a parallel phase accumulator value comprised of a plurality of elements, each element including a sample number and a fractional phase value;

a logic controller receiving the parallel phase accumulator value and a frequency control signal, the logic controller generating a parallel interval control value defining a desired time delay between an input sample and a required output sample, the logic controller also generating a parallel control build value comprising the phase accumulator value with repeated sample numbers indicated for reduction to a single sample;

a parallel interpolator receiving the parallel digital input data stream and the interval control value, and generating a parallel interpolator output data stream, the parallel interpolator output data stream including interpolated values at the intervals defined by the interval control value; and a parallel word builder receiving the parallel control build value from the logic controller and the parallel interpolator output data stream, the parallel word builder assembling valid samples from the parallel interpolator output data stream to form the parallel digital output data stream comprised of interpolated values corresponding to consecutively numbered samples.

2. The apparatus of claim 1 wherein the parallel digital input data stream and parallel digital output data stream comprises a number of parallel digital samples "P".

3. The apparatus of claim 2 wherein the parallel phase accumulator receives the sample control signal and multiplies the sample control signal by values, of sample numbers 1, 2, . . . , P, where the product of the sample control signal and the value of sample number P for a previous clock cycle defines a reference phase value, and subtracting each product value for sample numbers 1, 2, . . . , P from the reference phase value yields 1, 2, . . . , P sums, the parallel phase accumulator value comprised of the sums.

4. The apparatus of claim 2 wherein the logic controller generates the interval control value in accordance with the product of the frequency control signal and each of sample numbers 1, 2, . . . , P to define products 1, 2, . . . , P that comprise the interval control value.

5. The apparatus of claim 2 wherein the logic controller generates the control build value by comparing adjacent samples of sample numbers 1, 2, . . . , P in the phase accumulator value and marking repeated sample numbers for reduction to a single sample, thereby removing repeated sample numbers.

6. The apparatus of claim 2 wherein the parallel interpolator interpolates the digital input data stream to specific sample numbers in accordance with the interval control value for each of sample numbers 1, 2, . . . , P of the input data stream to generate P number of the interpolated values.

7. The apparatus of claim 6 wherein the parallel interpolator comprises one of a linear, parabolic, and cubic interpolation.

8. The apparatus of claim 2 wherein the parallel word builder further comprises:

a shift controller for inspecting sample numbers 1, 2, . . . , P of the interpolated value to determine that a predetermined sample number appears within a predetermined range of shift controller output sample positions, the shift controller generating a parallel shift data stream and a parallel shift control value; and a multiplexer receiving the shift control value and selecting samples from the shift data stream to output P number of adjacent, valid data samples in the output data stream.

9. A method of sample rate reduction for reducing a parallel digital input data stream sampled at a sample clock rate into a parallel digital output data stream at a sample rate asynchronous with respect to the sample clock rate, comprising:

generating a parallel phase accumulator value in accordance with a sample control signal that varies in accordance with a desired sample frequency, the phase accumulator value comprised of a plurality of elements, each element including a sample number and a fractional phase value;

generating a parallel interval control value in accordance with the phase accumulator value and a frequency control signal, the interval control value defining a desired time delay between a digital input sample and a required output sample;

generating a parallel control build value from adjacent sample numbers of the phase accumulator value and marking sample numbers for reducing repeated sample values to a single sample;

generating a parallel interpolator output data stream by interpolating sample values at intervals defined by the interval control value; and generating a digital output data stream in accordance with the parallel control build value and the interpolator output data stream by assembling samples from the interpolator output data stream to form the parallel digital output data stream, the parallel digital output data stream comprising interpolated values corresponding to consecutively numbered samples.

10. The method of claim 9 wherein the parallel digital input data stream and parallel digital output data stream comprises a number of parallel digital samples "P".

11. The method of claim 9 further comprising multiplying the sample control signal by values of sample numbers, 1, 2, . . . , P, where the product of the sample control signal and the value of sample numbers for a previous clock cycle defines a reference phase value, and subtracting each product value for sample numbers 1, 2, . . . , P from the reference phase value to yield 1, 2, . . . , P sums, the parallel phase accumulator value being comprised of the sums.

12. The method of claim 9 wherein determining the interval control value further comprises determining the product of the frequency control signal and each of sample numbers 1, 2, . . . , P to define products 1, 2, . . . , P that comprise the interval control value.

13. The method of claim 9 wherein determining the control build value further comprises comparing adjacent samples of sample numbers 1, 2, . . . , P in the phase accumulator value and reducing similar, adjacent samples to a single sample, thereby minimizing similar sample numbers.

14. The method of claim 9 wherein interpolating the digital input data stream further comprises interpolating the digital input data stream to specific sample numbers in accordance with the interval control value for each of sample numbers 1, 2, . . . , P of the digital input data stream to generate P number of the interpolated values.

15. The method of claim 9 wherein generating the output data stream further comprises:

evaluating sample numbers 1, 2, . . . , P of the interpolated value to determine that a predetermined sample number appears within a predetermined range of output sample positions, thereby generating a parallel shift data stream and a parallel shift control value; and evaluating the shift control value and selecting samples from the shift data stream to output P number of adjacent, valid data samples in the output data stream.

* * * * *